March 15, 1955     L. C. JOHNSON     2,704,162
ATTACHMENT FOR MOBILE UNIT FOR HANDLING OF PIPE SECTIONS
Filed March 31, 1954.     3 Sheets-Sheet 1

INVENTOR.
Lynn C. Johnson.
BY
Fishburnt Mullendore
ATTORNEYS.

March 15, 1955 L. C. JOHNSON 2,704,162
ATTACHMENT FOR MOBILE UNIT FOR HANDLING OF PIPE SECTIONS
Filed March 31, 1954 3 Sheets-Sheet 2
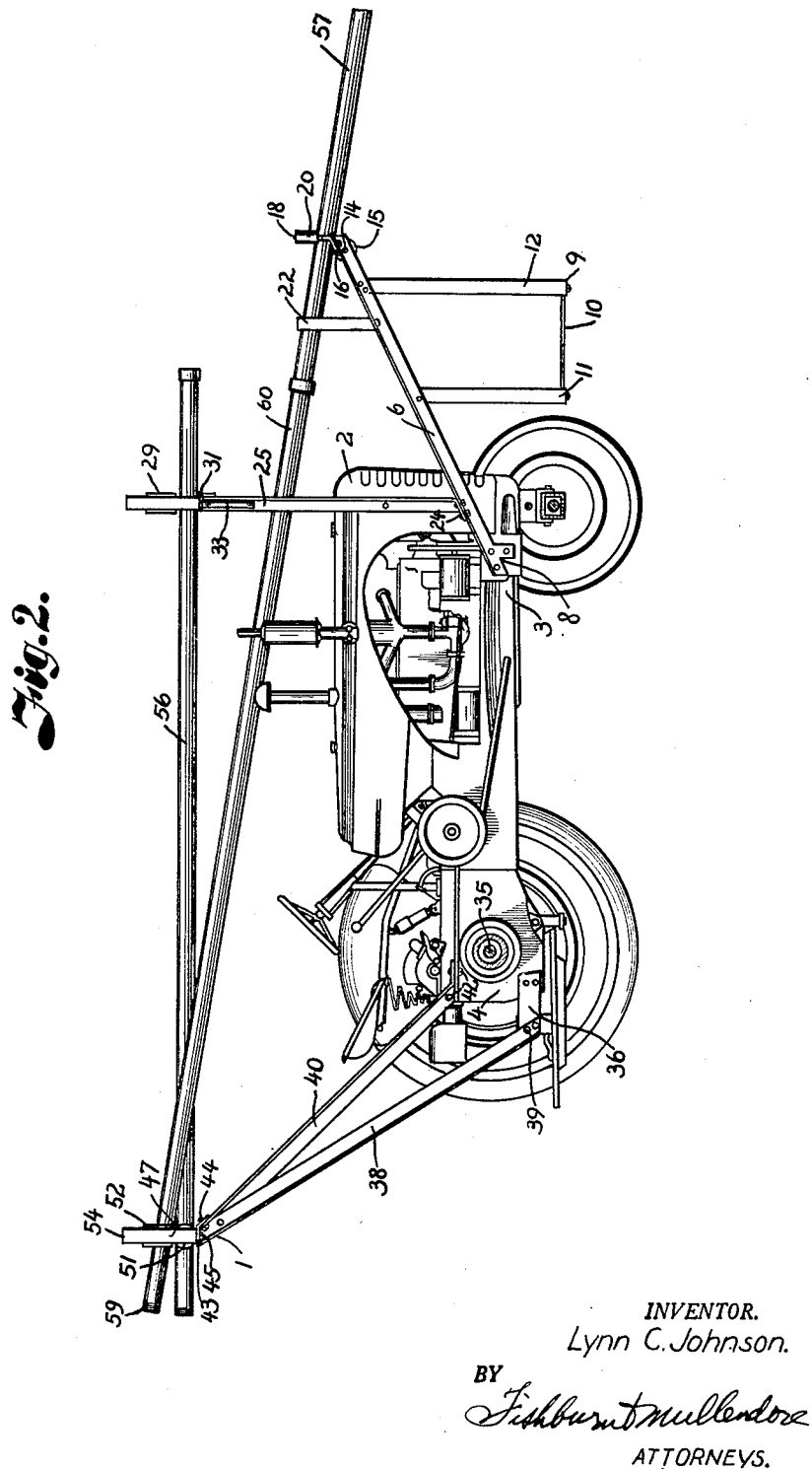
INVENTOR.
Lynn C. Johnson.
BY
ATTORNEYS.

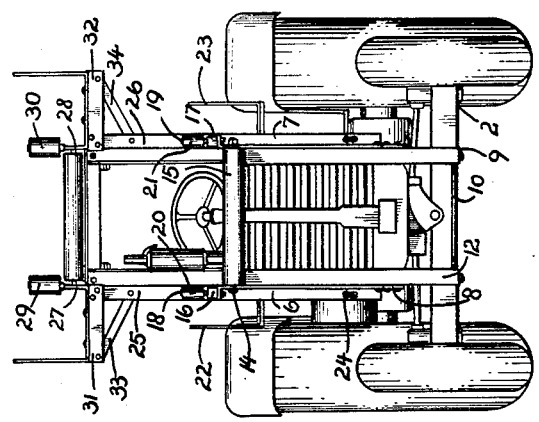
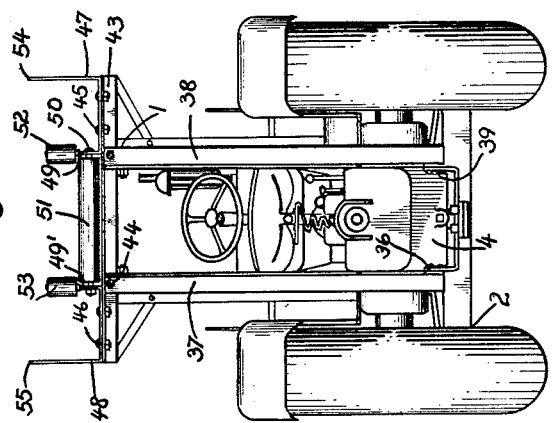

UNITED STATES PATENT OFFICE 2,704,162
Patented Mar. 15, 1955

2,704,162

ATTACHMENT FOR MOBILE UNIT FOR HANDLING OF PIPE SECTIONS

Lynn C. Johnson, Davenport, Nebr.

Application March 31, 1954, Serial No. 420,155

7 Claims. (Cl. 214—84)

This invention relates to an attachment for a tractor or the like for the handling of pipe sections, and more particularly to an attachment for tractors for engaging underneath a line of pipe for raising the same to be disconnected, and racking the same for transporting to a place of use or storage.

Heretofore in disconnection of pipe lines it has been necessary for the workmen to disconnect the same on the ground and then load them on trucks or the like for transportation to another place of use or for storage.

My invention is particularly adapted for use in connection with pipe sections used in sprinkler and water systems in truck farming where change in lines is often desirable, although it is adaptable for other uses.

It is the principal object of the present invention to provide an attachment for tractors or the like having a platform upon which workmen may stand and having a roller for engaging under the end of the line and by movement of the tractor forwardly, the joined portion of the pipe may approach the workman for disconnection and then be raised to racks on the attachment for transportation.

Other objects of the present invention are to provide standards extending upwardly of the front end of the tractor having outwardly extending brackets forming racks for reception of the sections of pipe; to provide rearwardly extending arms on the rear of the tractor having brackets forming racks for reception of one end of the pipe for supporting the same, the racks being so situated with respect to the driver of the tractor that he may assist the workman on the platform in placing the pipe in the racks; to provide roller means on the brackets for easy movement of the sections of pipe thereon; and to provide a device of this character simple and economical to manufacture.

In accomplishing these and other objects of the invention, as hereinafter pointed out, I have provided improved structure, the preferred forms of which are illustrated in the accompanying drawings wherein:

Fig. 2 is a side view of the invention with one rear wheel removed showing a section of pipe in the racks and the line contacted by the roller means at the front of the tractor and the rear bracket of the apparatus.

Fig. 3 is a rear view of the apparatus shown attached to the tractor.

Fig. 4 is a front view of the apparatus shown attached to the tractor.

Figure 1:
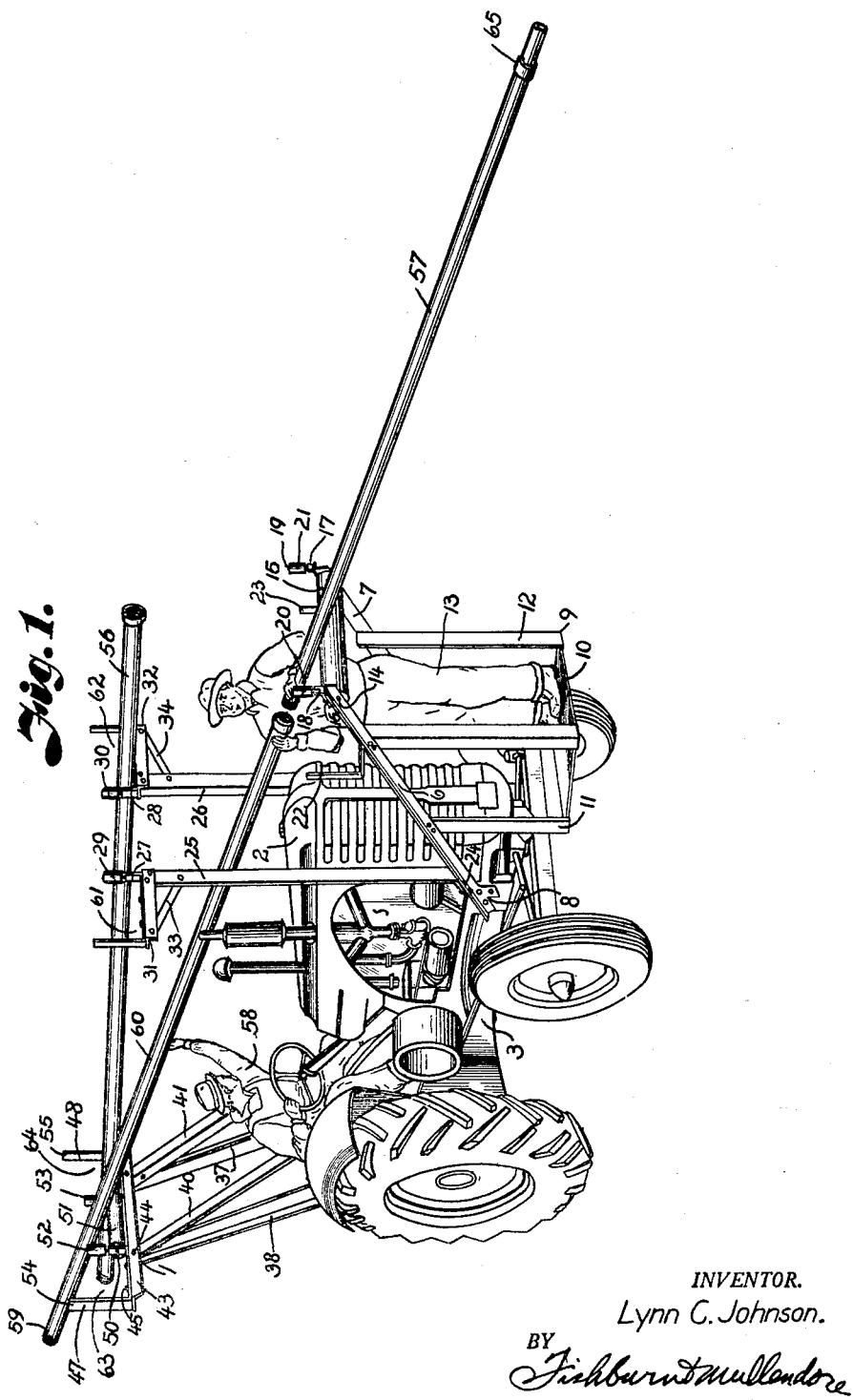
Fig. 1 is a perspective view of my invention showing the same in operation with a pipe line to be disconnected.

Referring more in detail to the drawings:

1 designates an attachment for a tractor 2 embodying the features of my invention, the tractor having a frame 3 which extends rearwardly of the tractor as indicated at 4, Fig. 2.

Rigidly secured to the frame 3 of the tractor on either side thereof is a pipe engaging and raising carriage 5 comprising arms 6 and 7 extending forwardly and upwardly of the tractor so that the front end is substantially of the same height of the tractor. The rear ends of the arms are secured to the frame of the tractor by bolts or the like as indicated at 8. Depending from the forwardly extending arms 6 and 7 is a stage or platform 9 having a bottom 10 with corner posts as indicated at 11 and 12 for accommodating a workman as indicated at 13. Mounted on a cross shaft 14 at the forward end of the arms 6 and 7 is a roller 15.

Brackets 16 and 17 are secured to the forward ends of the arms 6 and 7, respectively, having upwardly extending shafts 18 and 19 for mounting of rollers 20 and 21. Secured to the arms 6 and 7 and positioned adjacent the platform 9 are outwardly and upwardly extending brackets 22 and 23 for a purpose later described.

Secured to the arms 6 and 7 by bolts or the like as indicated at 24 (Fig. 2) are uprights or standards 25 and 26, on the upper end of which are shafts 27 and 28 for rollers 29 and 30. Secured to the uprights 25 and 26 are outwardly and upwardly extending brackets 31 and 32 having braces 33 and 34 providing racks for supporting one end of the pipe after it is disconnected from the line.

Attached to the rear end of the frame of the tractor underneath the rear axle 35 are bracket arms 36 to which are rigidly attached upwardly and rearwardly extending arms 37 and 38, the lower ends of which are secured to the bracket arms 36 by bolts or the like 39. Secured to the framework 4 on each side thereof are rearwardly and upwardly extending arms 40 and 41 having their lower ends secured to the frame by bolts or the like as indicated at 42 (Fig. 2). A cross arm 43 is secured to the upper ends of the arms 37 and 38 and 40 and 41 by bolts or the like as indicated at 44 to which is secured by bolts or the like 45 and 46 U-shaped bracket members 47 and 48, the inner arm of which is secured to the uprights 49 and 49'. A shaft 50 extends above the uprights upon which is mounted a roller 51. Vertically mounted upon the uprights 49 and 49' are rollers 52 and 53. The outer arms 54 and 55 of the U-shaped members 47 and 48 extend to slightly above the rollers 52 and 53 forming supports or racks for the pipe sections 56 after they are disconnected from the pipe line 57.

The operation of the apparatus constructed and assembled as described is as follows:

The operator 58 of the tractor will drive the tractor forwardly so that the end 59 of the pipe line 57 may be engaged by the forwardly extending carriage 5 and will pass over the roller 15 until the end 59 engages the roller 51 on the rearwardly extending uprights of the tractor. The workman 13 may then disconnect section 60 from the line as best illustrated in Fig. 1 and raise the section and place it in either of the racks or supports 61 and 62 on the forward uprights 25 and 26. The operator 58 of the tractor may then raise the rear end 59 of the section of pipe and place it in one or another of the racks or supports 63 and 64 on the rear of the apparatus after which he again moves the tractor forwardly until the next section 65 of the pipe approaches the workman so that he may disconnect the same while standing in the platform 10, and then the operation is repeated.

The vertical rollers 21 and 22 and 52 and 53 are provided to prevent the pipe from sliding off the end of the rollers 50 and 51 and to facilitate movement of the pipe on the apparatus. The bracket arms 22 and 23 on the forwardly extending arms 6 and 7 are provided so that workman may rest the section 60 of the pipe thereon if desired and after it has been disconnected.

It will be obvious from the foregoing that I have provided a new improved apparatus for engaging pipe lines, disconnecting the same and transporting it to a place of storage with the minimum amount of effort.

It will also be obvious that the apparatus may be used for laying a pipe line if desired in which the sections of pipe would be placed on the racks and transported to a place of use and connected by the workman instead of disconnected as above described, in which event the tractor would be driven rearwardly instead of forwardly in laying the pipe.

It will also be obvious that the apparatus may be used wherever pipe lines or sprinkler systems are laid without departing from the spirit of my invention.

While I have here illustrated the framework structure to be of angle iron construction, it will also be obvious that other structure may be used without departing from the spirit of my invention.

What I claim and desire to secure by Letters Patent is:

1. An attachment for a mobile unit having a frame comprising, a pair of spaced arms having one end rigidly secured to said unit frame, said arms extending forwardly and upwardly ahead of the unit, a shaft connecting the forward ends of the arms, a roller on said shaft for supporting the end of connected pipe sections, a platform carried by said arms to accommodate a workman for disconnecting said pipe sections, spaced arms rigidly secured to the rear of said unit and extending above said unit, and a plurality of racks supported by the pairs of arms above said unit for receiving said pipe sections after being disconnected by the workman on said platform.

2. An attachment for a mobile unit having a frame comprising, a pair of spaced arms having one end rigidly secured to said unit frame, said arms extending forwardly and upwardly ahead of the unit, a shaft connecting the forward ends of the arms, a roller on said shaft for supporting the end of connected pipe sections and for movement of said sections thereover, a platform carried by said arms to accommodate a workman for disconnecting said pipe sections, spaced arms rigidly secured to the rear of said unit and extending above said unit, a shaft connecting the free ends of said rearwardly extending arms, a roller on said shaft for receiving the end of said pipe sections as the unit is moved forwardly, and a plurality of racks supported by the pairs of arms above said unit for receiving said pipe sections after being disconnected by the workman on said platform.

3. An attachment for a mobile unit having a frame comprising, a pair of spaced arms having one end rigidly secured to said unit frame, said arms extending forwardly and upwardly ahead of the unit, a shaft connecting the forward ends of the arms, a roller on said shaft for supporting the end of connected pipe sections and for movement of said sections thereover, a platform carried by said arms to accommodate a workman for disconnecting said pipe sections, spaced arms rigidly secured to the rear of said unit and extending above said unit, a shaft connecting the free ends of said rearwardly extending arms, a roller on said shaft for receiving the end of said pipe sections as the unit is moved forwardly, racks supported by the forwardly extending arms above said unit, and racks supported by the rearwardly extending arms for receiving said pipe sections after being disconnected by the workman on said platform.

4. An attachment for a mobile unit having a frame comprising, a pair of spaced arms having one end rigidly secured to said unit frame, said arms extending forwardly and upwardly ahead of the unit, a shaft connecting the forward ends of the arms, a roller on said shaft for supporting the end of connected pipe sections, a platform carried by said arms to accommodate a workman for disconnecting said pipe sections, spaced arms rigidly secured to the rear of said unit and extending above said unit, means connecting said last-named arms, racks supported by the last-named arms above said unit, standards carried by the forwardly extending arms and extending above the unit, racks carried by the standards, all of said racks receiving said pipe sections after being disconnected by the workman on said platform.

5. An attachment for a tractor having a frame comprising, a pair of spaced arms having one end rigidly secured to the forward end of the tractor frame, said arms extending forwardly and upwardly ahead of the tractor, a shaft connecting the forward ends of the arms, a roller on said shaft for supporting the end of connected pipe sections, a platform carried by said arms to accommodate a workman for disconnecting said pipe sections, spaced arms rigidly secured to the rear of said tractor and extending above said tractor, means connecting said last-named arms, spaced racks supported by the last-named arms above said tractor, a roller mounted on said connecting means between said racks, standards carried by the forwardly extending arms and extending above the tractor, and racks carried by the standards, all of said racks receiving said pipe sections after being disconnected by the workman on said platform.

6. An attachment for a tractor having a frame comprising, a pair of spaced arms having one end rigidly secured to the forward end of the tractor frame, said arms extending forwardly and upwardly ahead of the tractor, a shaft connecting the forward ends of the arms, a roller on said shaft forming a support for connected pipe sections and for movement of said sections thereover when the tractor is driven forwardly to raise said sections of pipe, a platform carried by said arms to accommodate a workman for disconnecting said pipe sections, spaced arms rigidly secured to the rear of said tractor and extending above said tractor, a shaft connecting the free ends of said rearwardly extending arms, a roller on said shaft for receiving one end of said pipe sections as the tractor is moved forwardly while the workman is working on the other end, racks supported by the forwardly extending arms above said tractor, and racks supported by the rearwardly extending arms for receiving said pipe sections after being disconnected by the workman on said platform.

7. An attachment for a mobile unit having a frame comprising, a pair of spaced arms having one end rigidly secured to said unit frame, said arms extending forwardly and upwardly ahead of the unit, a shaft connecting the forward ends of the arms, a roller on said shaft forming a support for connected pipe sections and for movement of said sections thereover, rollers rotatably mounted on the forward ends of said arms and extending vertically of said roller support to facilitate movement of the pipe sections over the support, a platform carried by said arms to accommodate a workman for disconnecting said pipe sections, spaced arms rigidly secured to the rear of said unit and extending above said unit, a shaft connecting the free ends of said rearwardly extending arms, a roller on said shaft for receiving one end of said pipe sections as the unit is moved forwardly, rollers mounted vertically on said rearwardly extending arms adjacent the ends of said roller on said arms, and a plurality of racks supported by the pairs of arms above said unit for receiving said pipe sections after being disconnected by the workman on said platform.

No references cited.